United States Patent
Rubin (10) Patent No.: US 7,925,605 B1
(45) Date of Patent: Apr. 12, 2011

(54) EVOLUTIONARY EXPERT SYSTEMS AND METHODS USING META-RULES MATCHING

(75) Inventor: Stuart H. Rubin, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 877 days.

(21) Appl. No.: 11/854,638

(22) Filed: Sep. 13, 2007

(51) Int. Cl.
*G06F 17/00* (2006.01)
*G06N 5/02* (2006.01)

(52) U.S. Cl. .......................................................... 706/47
(58) Field of Classification Search .................. 706/47
See application file for complete search history.

(56) References Cited

U.S. PATENT DOCUMENTS

| 6,513,024 B1 | 1/2003 | Li |
| 6,601,048 B1 | 7/2003 | Gavan et al. |
| 6,625,500 B1 | 9/2003 | Li |

OTHER PUBLICATIONS

Rubin et al. "KASER: Knowledge Amplification by Structured Expert Randomization", IEEE SMC—Part B, vol. 34, No. 6, 2004, pp. 2317-2329.*

Hirsh "Explanation-Based Generalization in a Logic-Programming Environment", Knowledge Acquisition, pp. 221-227.*

Srikant et al. "Mining Quantitative Association Rules in Large Relational Tables", SIGMOD, '96, pp. 1-12.*

Stuart H. Rubin, Shu-Ching Chen, and James B. Law, T2K2: A Type II KASER, symposium, Sep. 16-18, 2006, pp. 147-153, The 2006 IEEE International Conference on Information Reuse and Integration (IEEE IRI-2006), Hawaii, USA.

* cited by examiner

*Primary Examiner* — Donald Sparks
*Assistant Examiner* — Li-Wu Chang
(74) *Attorney, Agent, or Firm* — Kyle Eppele; J. Eric Anderson (57) ABSTRACT

In various embodiments, evolutionary expert systems and methods are disclosed. For example, a method for evolving a rule base of an expert system includes creating a set of meta-rules from a set of first rules associated with the expert system, creating a set of one or more generalized virtual rule candidates based on the set of first rules and the set of meta-rules, filtering the set of generalized virtual rule candidates to remove generalized virtual rule candidates that conflict with at least one rule of the set of first rules to form a set of virtual rules, and incorporating at least one virtual rule of the set of virtual rules into the set of first rules to evolve the first set of rules.

5 Claims, 3 Drawing Sheets

EVOLUTIONARY EXPERT SYSTEMS AND METHODS USING META-RULES MATCHING

BACKGROUND

I. Field

This disclosure relates to expert systems and other information processing apparatuses and methods.

II. Background

An expert system can be described as a program or system that contains some subject-specific knowledge and emulates human reasoning. Typically, expert systems include a user interface, a knowledge base, an inference engine and a data base. The user interface provides a portal for a user to interact with the expert system; the data base feeds data to the expert system; the knowledge base contains the rules that control the reasoning process; and the inference engine itself processes the rules inside the knowledge base to emulate reasoning.

An example of an expert system might be a banking system configured to process loan applications. After an applicant files a loan application, the data from the loan application can be fed to the knowledge base, where rules embedded within the expert system could determine the applicant's credit worthiness.

In existing systems, knowledge bases tend to be hard-coded such that rules are static, somewhat inflexible and cannot easily be changed. To be changed, a programmer may need to edit the knowledge base in such a way that the previous knowledge base may or may not be valid anymore. In addition, expert systems may also be limiting in that their knowledge bases may contain information necessary to resolve an issue, but are expressed in a way that the inference engine cannot process efficiently if at all. Accordingly, it may be desirable to develop new technologies that can expand the capacities of expert systems.

SUMMARY

Various aspects and embodiments of the invention are described in further detail below.

In a first series of embodiments, a method for evolving a rule base of an expert system includes creating a set of meta-rules from a set of first rules associated with the expert system, creating a set of one or more generalized virtual rule candidates based on the set of first rules and the set of meta-rules, filtering the set of generalized virtual rule candidates to remove generalized virtual rule candidates that conflict with at least one rule of the a set of first rules to form a set of virtual rules, and incorporating at least one virtual rule of the set of virtual rules into the set of first rules to evolve the first set of rules.

In another series of embodiments, an expert system capable of evolving a rule base includes an inference engine configured to create a set of meta-rules from a set of first rules associated with the expert system, then create a set of one or more generalized virtual rule candidates based on the set of first rules and the set of meta-rules, and a filtering device configured to filter the set of generalized virtual rule candidates to remove generalized virtual rule candidates that conflict with at least one rule of the a set of first rules to form a set of virtual rules and incorporate at least one virtual rule of the set of virtual rules into the set of first rules to evolve the first set of rules.

In yet another series of embodiments, a computer-readable memory contains instructions that, when accessed by a computing system, enables the computing system to evolve a rule base. The memory includes a set of first instructions for creating a set of meta-rules from a set of first rules associated with the expert system, a set of second instructions for creating a set of one or more generalized virtual rule candidates based on the set of first rules and the set of meta-rules, a set of third instructions for filtering the set of generalized virtual rule candidates to remove generalized virtual rule candidates that conflict with at least one rule of the set of first rules to form a set of virtual rules, and a set of fourth instructions for incorporating at least one virtual rule of the set of virtual rules into the set of first rules to evolve the first set of rules.

BRIEF DESCRIPTION OF THE DRAWINGS

The features and nature of the present disclosure will become more apparent from the detailed description set forth below when taken in conjunction with the accompanying drawings in which reference characters identify corresponding items.

DETAILED DESCRIPTION

The disclosed methods and systems below may be described generally, as well as in terms of specific examples and/or specific embodiments. For instances where references are made to detailed examples and/or embodiments, it should be appreciated that any of the underlying principals described are not to be limited to a single embodiment, but may be expanded for use with any of the other methods and systems described herein as will be understood by one of ordinary skill in the art unless otherwise stated specifically.

Some of the advantages of the methods and systems described below include an ability of a system to learn by inductive transformation and enabling a rule base to evolve to satisfy application needs. However, a large number of additional advantages will become apparent to those in the art in view of the disclosure below.

For the purpose of this disclosure, a "rule" can be described as a logical construct having and antecedent and a consequent. Examples of rule scan be found below with respect to Eqs (1) and (2).

$$f_0, f_1, f_2 \rightarrow p_0, p_1, p_2 \qquad \text{Eq (1)}$$

$$f_1, f_3 \rightarrow p_1, p_3 \qquad \text{Eq (2)}$$

where $f_0 \ldots f_3$ are the left-hand side (LHS) functions that, when conjoined logically, constitute the antecedent of a rule, and where $p_0 \ldots p_3$ are the right-hand side (RHS) procedures that constitute the consequent of a rule.

Meta-rules can be described as rules that describe how other rules should be used. For this disclosure, a meta-rule base can be a set of transformation rules that are automatically created from an application rule base. Generally, it should be appreciated that, while rules should be deterministic (i.e., have only one unique consequent), meta-rules may include deterministic and non-deterministic logical constructs as may be recognized in the relevant arts. Additional materials regarding the disclosed methods and systems may be found in the Appendix below with the understanding that the information in the Appendix relates to a particular detailed embodiment, and the methods and systems of the immediate disclosure should not be limited thereto.

Figure 1:
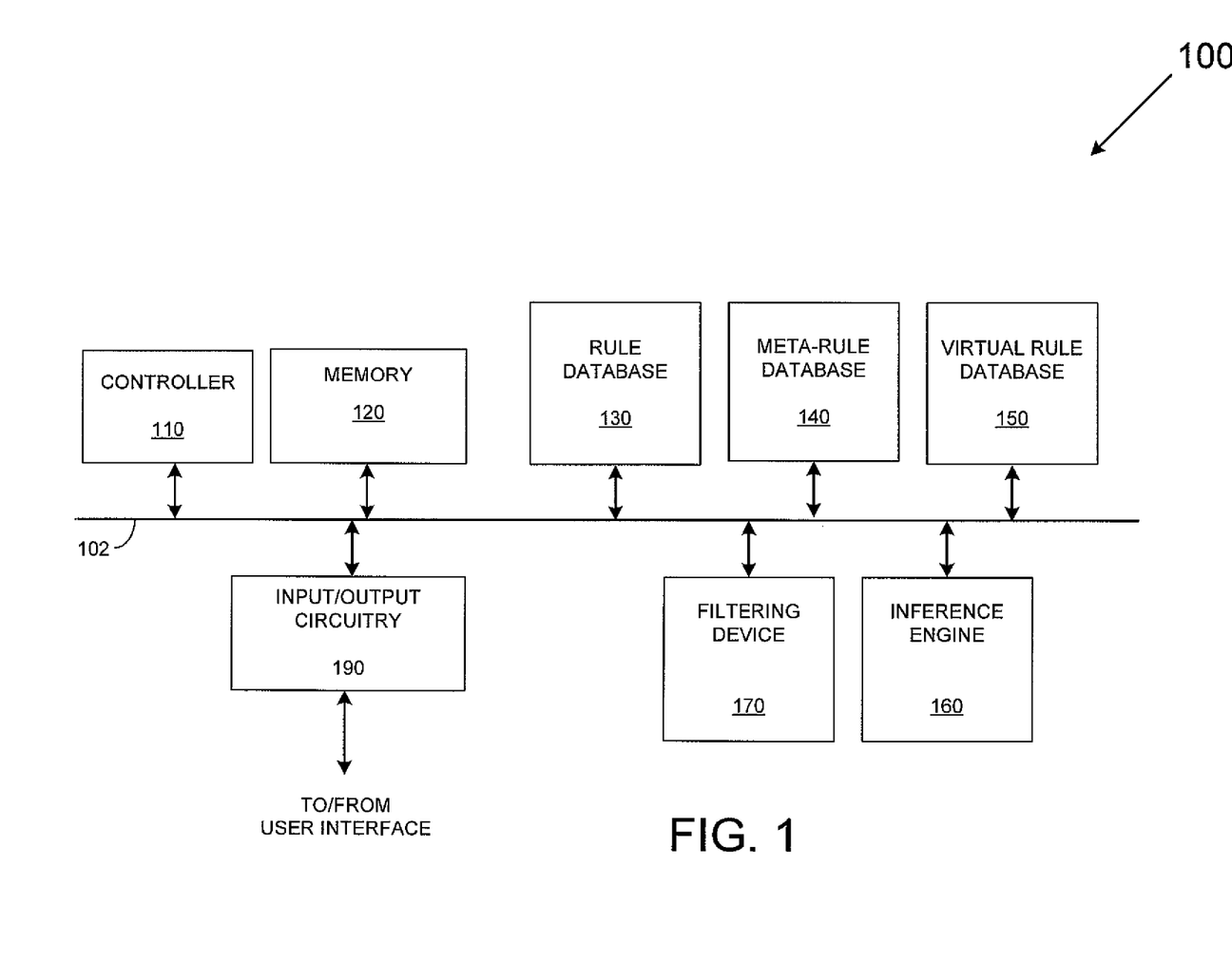
FIG. 1 depicts an exemplary expert system.

FIG. 1 depicts an exemplary expert system 100. As shown in FIG. 1, the exemplary expert system 100 includes a controller 110, a memory 120, a rule database 130, a meta-rule database 140, a virtual rule database 150, an inference engine 160, a filtering device 170 and input/output circuitry 190. The above-components 110-190 are coupled together using control/data bus 102.

Although the exemplary expert system 100 of FIG. 1 uses a bussed architecture, it should be appreciated that any other architecture may be used as is well known to those of ordinary skill in the art. For example, in various embodiments, the various components 110-190 can take the form of separate electronic components coupled together via a series of separate busses.

Still further, in other embodiments, one or more of the various components 110-190 can take form of separate processing systems coupled together via one or more networks. Additionally, it should be appreciated that each of components 110-190 advantageously can be realized using multiple computing devices employed in a cooperative fashion.

It also should be appreciated that some of the above-listed components 160-170 can take the form of software/firmware routines residing in memory 120 and be capable of being executed by the controller 110, or even software/firmware routines residing in separate memories in separate computing systems being executed by different controllers.

In operation, the expert system 100 may need to establish a set of rules for the rule database 130. Typically, such rules may be provided from any number of human and computer sources. Additionally, such rules may be directed to a particular endeavor of human understanding, such as medical diagnostics and loan processing.

After the rule database 130 is established, the inference engine 160 may establish the meta-rule database 140 based on the rule database 130 and any number of embedded algorithms. As mentioned above, such meta-rules may be deterministic and/or non-deterministic.

Next, the inference engine 160 may establish a set of generalized virtual rule candidates in the virtual rule database 150 based on the rules in the rule database 130 and the meta-rules in the meta-rule database 140. Generally, while any number of processes may be used to create the generalized virtual rule candidates, the exemplary system 100 can use a form of "simulated annealing" as is depicted in FIG. 2.

Figure 2:
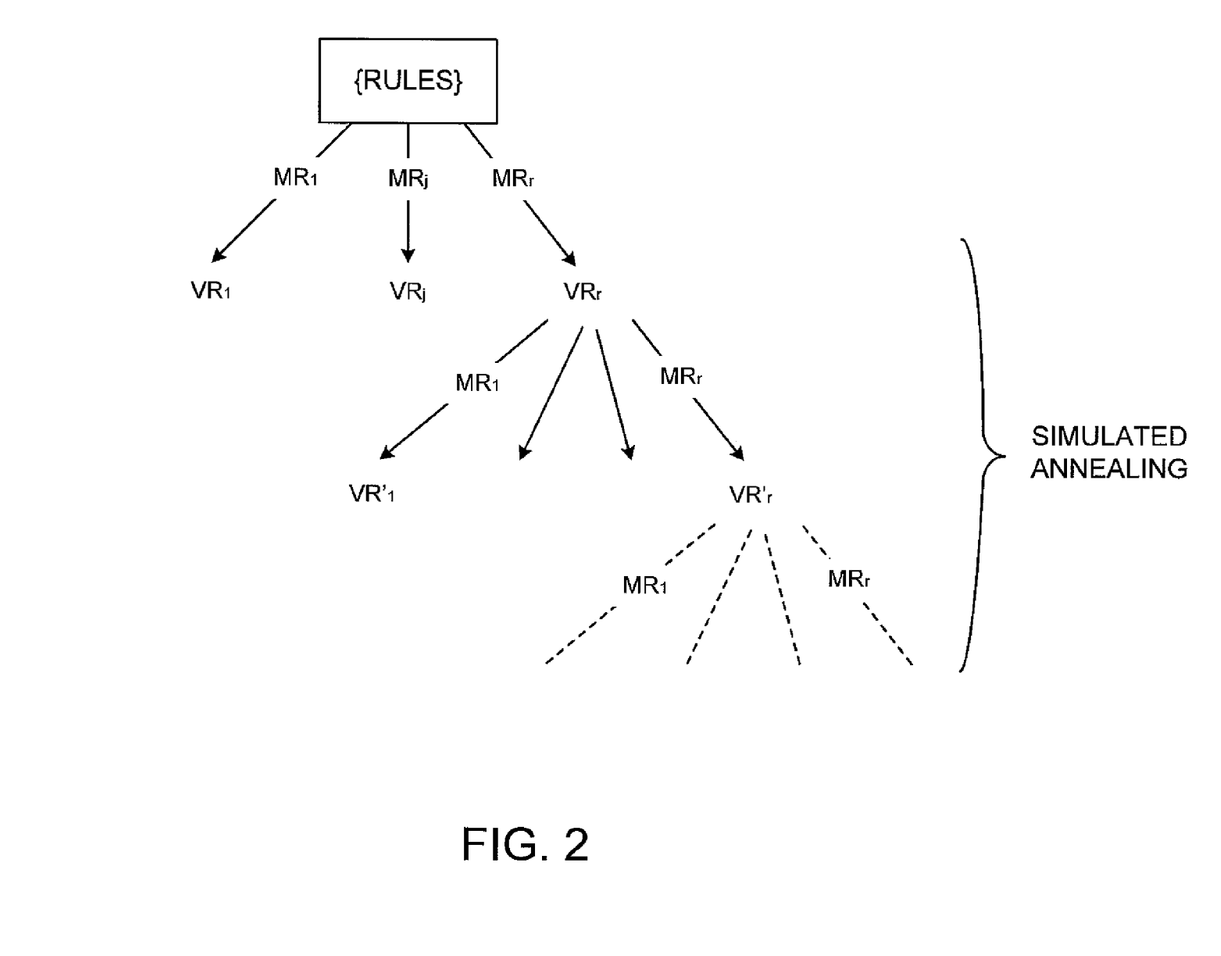
FIG. 2 depicts the creation of virtual rules.

As shown in FIG. 2, a set of {RULES} may be used to create a first set of generalized virtual rule candidates {$VR_1 \ldots VRr$} by way of meta-rule {$MR_1 \ldots MR_r$} application. Generally, such meta-rule {$MR_1 \ldots MRr$} application may be used to reduce context-mismatch, create generalizations, to create analogous rules and so on. As is also shown in FIG. 2, a second set of generalized virtual rule candidates {$VR'_1 \ldots VR'_r$} may also be created by way of meta-rule {$MR_1 \ldots MR_r$} application as may a third set, fourth set and so on. Generally, the number of iterations of meta-rule {$MR_1 \ldots MR_r$} application can be unlimited, but in various embodiments, it should be appreciated that it may be advantageous to apply limitations to the annealing process.

Returning to FIG. 1, after the virtual rule database 150 is populated with generalized virtual rule candidates, the filtering device 170 may be judiciously used to remove generalized virtual rule candidates that are non-deterministic, as well as remove generalized virtual rule candidates relating to rarely used material. For example, if a virtual rule in a medical diagnosis expert system is produced relating to a disease found only once every 10 years worldwide, it may be advantageous to remove such rule in order to save memory and reduce future processing as the rule's value may be virtually nil.

After the filtering device 170 filters the generalized virtual rule candidates to produce a set of virtual rules in the virtual rule database 150, such rules may be incorporated into the rule database 130 or perhaps verified in some additional manner before incorporation. For example, the expert system 100, using the input/output circuitry 190, may present any number of the virtual rules to a user for final verification and/or present such virtual rules to any number of automated verification processes as may be found necessary or advantageous.

Figure 3:
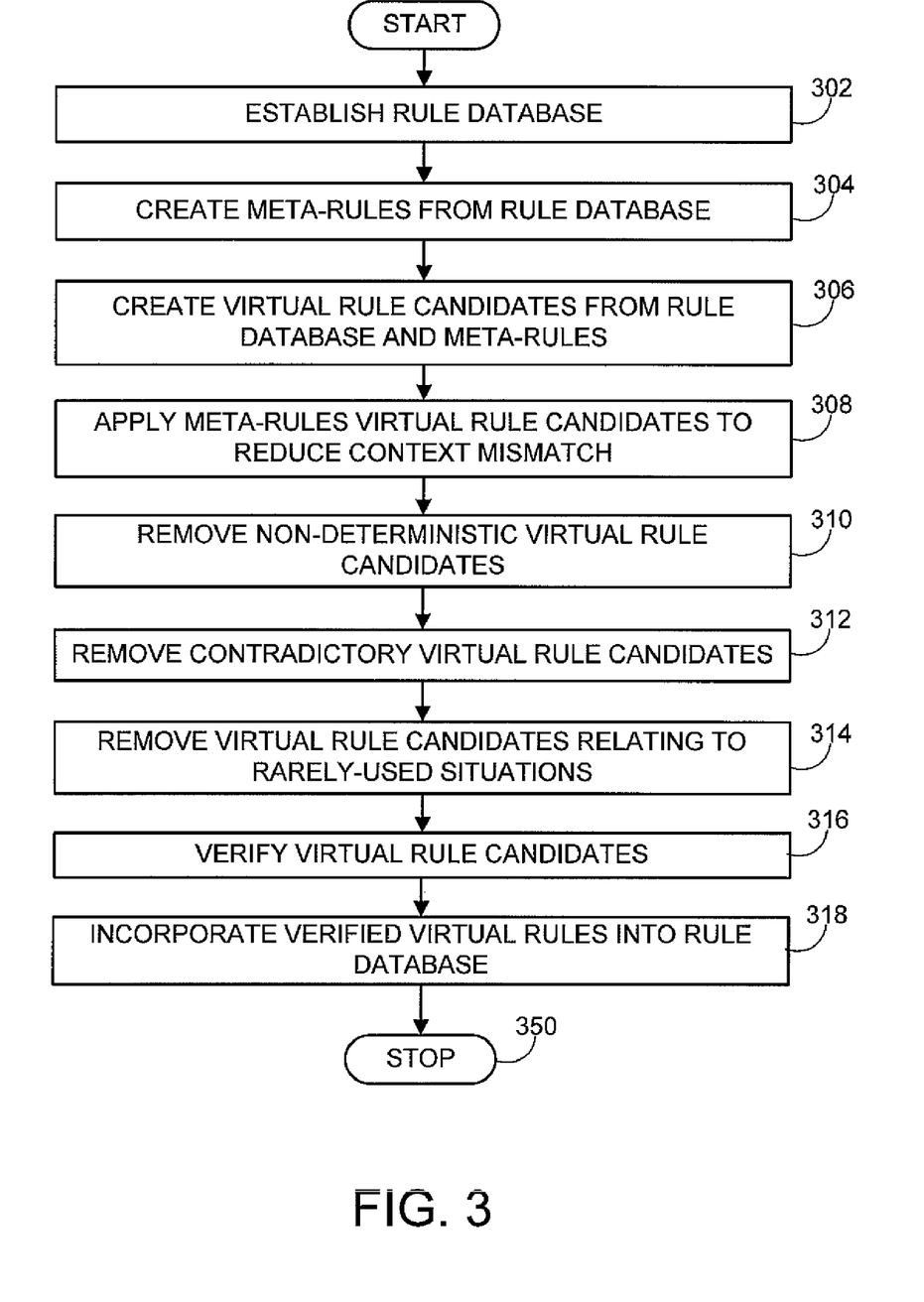
FIG. 3 is a flowchart outlining a number of exemplary operations of the disclosed methods and systems.

FIG. 3 is a flowchart outlining a number of exemplary operations of the disclosed methods and systems. The process starts in step 302 where an expert system rule base is established. Next, in step 304, a set of meta-rules may be created from the rules of step 302. As discussed above, while the set of rules can be deterministic, in a variety of embodiments meta-rules may be any combination of deterministic and non-deterministic logical constructs. Control continues to step 306.

In step 306, a set of one or more generalized virtual rule candidates may be created based on the rules and meta-rules. As mentioned above, creating generalized virtual rule candidates may include applying at least a portion of the meta-rules multiple times according to the simulated annealing process depicted in FIG. 2. Next, in step 308, the meta-rules may be applied to the generalized virtual rule candidates to reduce context mismatch. Then, in step 310, non-deterministic generalized virtual rule candidates can be eliminated from consideration. Control continues to step 312.

In step, 312, the generalized virtual rule candidates that conflict with any of the rules of step 302 may be removed/ filtered from consideration. Next, in step 314, generalized virtual rule candidates relating to rarely used material may also be removed/filtered from consideration. Then, in step 316, some or all of the remaining generalized virtual rule candidates may be verified. As discussed above, such verification may take the form of presenting virtual rules to a user for approval, or otherwise take the form of any combination of human action and machine computation noting that the highest level of confidence for a given virtual rule will generally be attributed to human-verified rules. Control continues to step 318.

In step 318, those virtual rules verified in step 318 may be incorporated into the rule base of step 302, and control continues to step 350 where the process stops.

In various embodiments where the above-described systems and/or methods are implemented using a programmable device, such as a computer-based system or programmable logic, it should be appreciated that the above-described systems and methods can be implemented using any of various known or later developed programming languages, such as "C", "C++", "FORTRAN", "Pascal", "VHDL" and the like.

Accordingly, various storage media, such as magnetic computer disks, optical disks, electronic memories and the like, can be prepared that can contain information that can direct a device, such as a computer, to implement the above-described systems and/or methods. Once an appropriate device has access to the information and programs contained on the storage media, the storage media can provide the information and programs to the device, thus enabling the device to perform the above-described systems and/or methods.

For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods related to communications.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

APPENDIX

Command Center Interface to Force-Net (CCIF)

Stuart H. Rubin[1]

Aug. 10, 2006

Expert[2] System

Abstract

The transformational methodology described in this disclosure induces new knowledge, which may be open under any deductive process. Of course, deductive logics may operate on the application rule base, in the background, to augment this methodology for certain applications. The method of transposition is used to maintain a maximum size for the application as well as meta-rule bases. The "move to head" method is used by both the application and meta-rule bases for hypotheses formation. Whenever an application rule is fired, it is transposed on the transposition list and also moved to the head on the other list. If any meta-rule on a solution path individually leads to a contradiction on the application rule base, then the offending meta-rule is expunged. Then, when the system is idle (e.g., overnight or napping) enter dream mode, whereby rule i$\Rightarrow$rule j is generated by the 3-2-1 skewed twister as a candidate most-specific meta-rule. Candidate most-specific meta-rules are "cored" to create one generalization per candidate. These candidate meta-rules are tested for application to each rule in the application domain rule base. In order to be saved in the meta base, they may not map any existing rule in the application domain rule base to one having the same antecedent as another in this base, but a different consequent (as found by hashing). In addition, all candidate meta-rules must map at least one rule in the application base to another distinct one there, or be symmetrically induced from meta-rules that so map.

Randomization is defined to mean any operation, which increases the density of information. This definition is not meant to necessarily imply the need for optimality across space-time compression.

An Expert[2] System is a Metaphor for an Information-Theoretic Black Hole and Performs the Following Functions.

a. Uses the semantic normalizer to randomize natural language for matching purposes. Application rule consequents should be run through the semantic normalizer prior to saving.

b. The semantic normalizer may be trained on procedurally-invoked truth maintenance operations (e.g., "posting" and "retraction"—especially in a closed domain using augmented natural languages) by observing user alterations to the context in response to the firing of some procedural consequents.

c. Cognition may result from allowing virtual rules to post and retract knowledge in a closed loop system of system pairs.

d. Provides a dump of valid rules, meta-rules, and virtual rule application sequence(s). Note that possibility metrics cannot be meaningfully ascribed because the system, in keeping with the dictates of the Incompleteness Theorem, can (rapidly) discover axioms that cannot be proven (or assigned a 100 percent possibility metric). Then, in the absence of formal constraints upon system actions, the door to free will is opened.

e. Offers a metaphorical explanation subsystem based on following a transformational chain.

f. Rules can invoke functional antecedents and procedural consequents.

g. Offers images and possibly video files and sound bytes.

h. Offers a professional speech synthesizer (e.g., http:www.oddcast.com/sitepal/) and a combination of voice (e.g., http://cmusphinx.sourceforge.net/html/cmusphinx.php) and typed data entry.

i. Can associatively recall word and sentence corrections using the Burdell Algorithm.

j. It can be integrated with a deductive calculus (e.g., the Japanese Fifth Generation) along with neural to subsymbolic sensory pre-processors.

k. The algorithm is amenable to cluster computing where the application rule base is global and the meta-rule base and related data structures are local. The parallel version requires O(r) processors for efficient computation.

l. Dolphins are known to sleep where half of their brain remains awake. It follows that given r processors, approximately any 50 percent of them will be awake/dreaming at any given time. Alternatively, all r processors may be awake/dreaming, but only 50 percent of the time, or thereabouts.

On the Acquisition and Use of Meta Rule Bases:

The functional LHS $\{f_0, f_1, f_2, \ldots\}$ of a rule will define a conjunction of Boolean functions, while the procedural RHS $(p_0, p_1, p_2, \ldots)$ will define a sequence (e.g., a rule base to play chess).

There will be two rule bases—one for user-supplied validated application domain rules and one for meta rules, which is machine generated for mapping application rules and meta rules onto new candidates.

Both rule bases apply the method of transposition to the fired rules so as to allow space occupied by the least-frequently used (LFU) rules to be reclaimed. In keeping with the principle of temporal locality, rules in the application domain and meta-rule bases maintain a logical pointer, which has a rule "move to the head" whenever it is properly fired. This is needed for efficient hypotheses formation.

The application domain rule base comprises production rules for all domains. A network of distributed processors may then act on this global repository. This model is consistent with an information-theoretic black hole as described in the paper, "On the Auto-Randomization of Knowledge" (Randomness and Symmetry article). For example, two distinct rules are:

1. $f_0, f_1, f_2, \ldots \rightarrow p_0, p_1, p_2, \ldots$
2. $f_1, f_3 \rightarrow p_1, p_3$ The meta-rule base comprises a set of transformation rules, which are automatically created from the application rule base during dreaming. "Coring" is realized using random search. For example, a most specific and an unrelated most general (i.e., "cored" using our statistical mechanical approach) meta-rule, followed by an induced symmetric meta rule are:

a. $f_0, f_1, f_2, \ldots \rightarrow p_0, p_1, p_2, \ldots \Rightarrow f'_0, f'_1, f'_2, \ldots \rightarrow p'_0, p'_1, p'_2, \ldots$ (most specific)
b. $f_1 \rightarrow p_1 \Rightarrow f'_1 \rightarrow p'_1$ (a more general meta rule)
c. $f_0, f'_1, f_2, \ldots \rightarrow p_0, p'_1, p_2, \ldots \Rightarrow f'_0, f'_1, f'_2, \ldots \rightarrow p'_0, p'_1, p'_2, \ldots$ (apply (b) to (a))

A "cored" rule need map its parent's LHS to its RHS. This is necessary to guarantee that at least one rule in the application domain base will be mapped to another. Such a complete mapping by the candidate meta-rule insures that this requirement will be satisfied in the most computationally efficient manner. The candidate meta-rule may not map any application domain rule to another domain rule already in the base, having a distinct consequent. Note that most specific meta-rules as well as more general meta-rules are to be cored. Coring the more general meta-rules allows for the hill climbing of still more general meta-rules in a manner that would not otherwise be computationally efficient. Successful most-specific and cored meta-rules are created at relatively great computational cost at chance. Thus, it follows that these resultant (pseudo) random seeds need to be extended by way of more economical symmetric induction. Also, the auto application of meta-rules enables the evolution of fixed point transformations in the meta-rule base, where the rule base is held constant. For example, we may find that $H = m \cdot r^2$, where H is the number of induced virtual rules, m is a domain-specific symmetry constant, and r is the number of rules in the application domain rule base. Note that we allow for r application domain rules, meta-rules, and 2r ADT rules (see below). The reason for this is that given a finite amount of memory, when the rule base is young, we favor creativity via meta-rules. Later, when the system is older, we favor stored application knowledge and retain only the most frequently used meta-rules. This is similar to human behavior—when people are young, they are most creative, but know the least (and vice versa). We will use the following meta-rule notation for convenience. $L1 \rightarrow R1 \Rightarrow L2 \rightarrow R2$. "Cored" meta rules may be formed as follows.

1. If a function is in L1 and not in L2, retain it in L1 and omit it from L2.
2. If a function is in L2 and not in L1, omit it from L1 and retain it in L2.
3. If a set of functions are in both L1 and L2, retain the same subset in L1 and L2. For example, starting with the previous most-specific meta rule, one has $f_0, f_2 \rightarrow \Rightarrow f_0, f_2 \rightarrow p'_1$. Note that there are $2^m$ subsets of F, where m is the number of functions common to both L1 and L2.
4. Use the Traditional "Coring" Method (TCM) to generalize $R1 \Rightarrow R2$. For example, starting with a most-specific meta rule: $p_0, p_1, p_2 \Rightarrow p_0, p_1, p_2, p_3$, we find that there are three "cored" rules; namely, $p_2 \Rightarrow p_2, p_3$; $p_1, p_2 \Rightarrow p_1, p_2, p_3$, and $p_0, p_1, p_2 \Rightarrow p_0, p_1, p_2, p_3$. The TCM requires the use of contiguous subsequences (i.e., $p_1, p_2$ here—not say $p_1, p_3$) because here the space of candidate meta-rules grows far larger than can be tractably searched in parallel—large-scale quantum computers not withstanding. Moreover, the TCM yields more robust meta-rules than is possible through the use of non-contiguous subsequences. This is the case because it is better to have a meta-rule that is less frequently applicable with higher validity than vice versa. Also, TCM meta-rules can continue to be generalized through the intermediary action of symmetric induction. Thus, correctness can be approximately preserved through the use of symmetric transformations, while increasing the space of possible transformations. New meta-rules are inserted at the bottom of both pointer lists because they have yet to compete for placement via transposition. Moreover, a pair of meta-rules may have identical antecedents and distinct consequents (i.e., non-determinism) and still map an application domain rule to a distinct pair of potentially valid application domain rules. For example, 1. $f_0, f_2 \rightarrow p_1 \Rightarrow f_2 \rightarrow p_3$
2. $f_0, f_2 \rightarrow p_1 \Rightarrow f_0 \rightarrow p_4$ Now, the upper bound or worst case for the TCM is $(n(n-1)/2)+n-1$, which reduces to, $(n(n+1)/2)-1$, which is $O(n^2)$, where n is the min $\{|R1|, |R2|\}$. However, the number of predicates in the search space is likely to be far less in practice so that a good estimate of the average case behavior for the TCM is $O(n)$. Combining these results with those for L1 and L2, we find that the worst case behavior for the overall meta rule is $O(2^m \cdot n^2)$, where m is the min $\{|L1|, |L2|\}$. Similarly, a good estimate of the average case behavior for the overall meta rule is $O(2^{m/2} \cdot n)$. Note that we used the exponent m/2 because it bears the same relation to m that n does to $n^2$. The complexity of the overall number of meta-rules is used to approximate the number of candidate meta-rules that can be formed for each visited application domain rule pair. As the rule base gets larger, an ever-greater percentage of meta-rules will be rejected. Then, the remaining candidates will tend to participate in the formation of ever-better hypotheses; albeit at the cost of more cpu cycles.

It follows that on the average there will be about $O(r^2)$ meta-rules. This implies $O(r^3)$ first-order candidate hypotheses (i.e., acting on r application rules), and so on depending upon the domain symmetry constant. This result strongly implies the need for a random "dream" mode to insure a non-skewed (i.e., where move to the head is not a factor) exploration of the search space. It similarly insures that there will be few collisions (i.e., depending on the move to the head skew) as desired. Moreover, random dreams are most compatible with fine-grained parallel processing.

Dreams can potentially flush out the meta-rule queue given sufficient time dreaming. However, this process does not lead to error because a) the queue then reflects the most recent move to head ordering of the application rule base, b) if the rule base is held to a constant ordering, then the meta-rule base is effectively annealed—increasing its problem-solving potential, and c) The virtual rule space will be maximized if the entire LHS of each meta-rule in the base is minimized. Thus, to balance the parallel processes of most-specific candidate rule creation, candidate cored meta-rule induction, and symmetric meta-rule induction over a finite meta-rule base, we need to expunge the LFU meta-rules off the bottom of the meta-rule base whenever it reaches its limiting size. Smaller, higher-quality rules will substitute for others in the meta-rule queue over time.

5. Next, we describe how to form the candidate meta-rules. A pair of distinct application domain rules are selected at random using the Mersenne Twister algorithm. Rules are selected with due regard to their logical position in the "move to head" pointer list. The higher the position of the rule in this list, the greater the likelihood of selection. A good scheme (i.e., the 3-2-1 skew) for achieving this with an application domain base of r rules is to assign the head rule a probability of being selected of $$\frac{2r}{r(r+1)}.$$

The rule just below the head rule has a probability of being selected of $$\frac{2(r-1)}{r(r+1)}.$$

Finally, the tail rule of the base has a probability of being selected of $$\frac{2}{r(r+1)}.$$

Meta-rules created during dreaming are properly inserted at the tail rather than at the head of the move to head list. This follows because if the meta-rules were to be inserted at the head, then over time the fixed point rules would float to the top and result in wasted cpu cycles as a result of duplicate cored and symmetric inductions. This methodology may be indirectly realized using the following algorithm. It is interesting to note that in accordance with Amarel's 1968 Machine Intelligence paper, this algorithm (or something equivalently efficient) could not be found by trying to solve the above equations, but only through a change of representation of the given problem. Notice that the method uses an initial skew to accelerate the results obtained during a short "nap", while "long nights" can best be served by a uniform random search for the "smallest" meta-rule. Moreover, since search time grows as the square of the application rule base size and the number of processors is necessarily linear, it follows that the system will not have time to get into pure uniform search with scale. This serves to underscore the importance of transposition in maintaining a quality meta-rule base. The "smaller" the meta-rules in the meta-rule base are, the larger will be the virtual rule space on the average. A highly efficient algorithm for realizing the 3-2-1 skew follows. Note that this algorithm has the added advantage of favoring just the head of the list during very short naps. Also, it is proper to stagnate at a uniform search of all (meta-) rules because skew search time grows as the order square of the size of the base, while the number of parallel processors can only grow linearly. Thus, a point is reached whereupon it is impossible to follow the skew to its conclusion. Should the skew naturally conclude in the small, then we may quit, or run in uniform search mode so as not to waste CPU cycles. Uniform search mode is to be preferred because it looks beyond the immediate past, which has been practically covered.

i=2
   Repeat
      For j=1 to i
         Repeat
            Select a pair of rules using a uniform random number generator (Twister) with numbers in [1, i]
         Until
            Wake-Up or the LHS and RHS of the pair are distinct
      The created pair constitutes a most-specific meta rule.
      If i<current number of rules in the base, i←i+1
   Until
      Wake-Up 6. Having created a most-specific candidate meta-rule, the next step is to check it against the rule base to insure that this candidate does not map a rule in the application domain rule base to another rule already in this base, which has a different consequent. This is an O(r) process per meta-rule, which is amenable to parallel processing. If a violation is found, then this most-specific candidate is discarded. At the same time (i.e., using parallel processors), create a candidate "cored" meta rule of the form, F→P ⇒ F'→P' using a 3-2-1 skewed meta distribution of the "move to head" pointer to select the parent meta-rule. A single meta rule "core" is generated at random (in parallel) so as to achieve a more uniform coverage of the search space, which is necessary since the search space can grow to an intractable size (i.e., but even partial explorations here can prove invaluable). The new candidate meta-rule core must be checked for contradiction against the application domain rule base just as were the most-specific meta-rules prior to saving them in the meta-rule base. In addition, cored (not symmetric) candidate meta-rules must map at least one rule in the application base to another distinct one there. Symmetric meta-rules are of relatively high quality in comparison with random cores. In the limit, when they apply they are correct (and more likely to be one to one with scale) and such results cannot practically overwrite the meta-rule base, since this base is gated on minimizing meta-rule size. Thus, symmetric meta-rules are to be accepted without any one to one mapping check. However, symmetric meta-rules need to be checked for contradiction at the time of their creation for the following reason. First, symmetric meta-rules tend to propagate exponentially faster than random, or cored, rules with scale. Thus, erroneous symmetric rules can potentially wipe out the meta-rule base before the next tree search. It follows that since the validity of an arbitrary meta-rule cannot be guaranteed after creation that induced symmetric meta-rules need to be checked for contradiction. In summary, there are at least three fundamental reasons not to do a one to one check on symmetrically-induced meta rules:
   a. Symmetric meta-rules inherit the validity of their parents, which itself increases with scale.
   b. Partial mappings (transformations) are permitted and desirable so long as they are of high quality (e.g., a predictor-corrector methodology).
   c. Occam's razor implies not to introduce new time-consuming code for one to one checking here.
7. The application rule base and meta-rule base are maintained using transposition ordering and "move to head" pointers. Unlike new meta-rules, new application rules are inserted at the head using both pointers. Distinct new meta-rules (i.e., hashed for non redundancy check) are inserted at the bottom of the meta-rule "move to head" and transposition lists, while these lists are not full. Ideally, the transposition list will move those meta-rules having the greatest number of successful applications to the top and act so as to preserve them. However, it would add an unwarranted order of magnitude complexity to the rule-verification algorithm (i.e., counting the number of proper one to one maps) to do this. An excellent surrogate metric for the number of successful applications is a meta-rules length, defined by $|f+p| \geqq 1$, where a meta-rule can transform just the $f_i$s or just the $p_j$s. That is, we need to preserve the shortest meta-rules because they tend to be the most applicable. Furthermore, minimizing the length of f and/or p serves to maximize reuse, which in turn maximizes the size of the virtual rule space. Moreover, it follows from the corner point, or simplest rule; namely, $f_i \to p_j$ that the $f_i$s and the $p_j$s should be equally weighted—in accordance with the metric given above. Note that the shorter rules, while more error-prone are subjected to more tests for contradiction by reason of their proportionately increased applicability. Now, if the meta-rule base is filled, search the linked transposition list from the bottom up for a meta-rule, if any, that has the same length as the candidate new meta-rule or greater. The meta-rules induced from the most-recently fired, or in other words skewed rules are the most important because they best anticipate the current needs. Make the replacement so as not to increase the sum of the lengths of all meta-rules in the base. Reducing the sum of meta-base lengths takes precedence over maintaining the existing transpositional ordering in keeping with the dictates of statistical mechanics. That is, on the average, the larger the meta-rule, the further it will lie from the front of the transposition list. This in turn means that, on the average, the closer a meta-rule is to the front of the transposition list the more likely it is to be preserved. Here, statistical mechanics allows for exceptions on an individual basis, but not when the cases are considered in the aggregate. Notice that "out of order" replacements are self-delimiting and thus, the more they occur, the less likely they will be able to occur in the future. In particular, this approach is necessary where less than $O(r^2)$ space is available for the meta-rule base so as to prevent flushing out previously proven highly applicable meta rules by most-specific, newly cored, or new symmetric ones. The meta-rule base should be of length, $O(r)$ with scale to balance the need for parallel processors with that of the application rule base. Finally, small meta-rules that are not used (i.e., sludge) will fall to the very bottom of the meta-rule base over time. This sludge must be removed because it can accumulate over time and clog the system. This is most efficiently accomplished by expunging the very last and only very last rule (i.e., whatever the length of the meta-rule base happens to be) on the meta-rule base transposition list every time the system enters napping or dream mode. Eventually, short meta-rules will replace the sludge at the very bottom, be fired, transpose with any sludge above, and iterate.

The existing semantic normalizer will normalize the context so that it can better cover a rule antecedent. The most-specific, highest transposed rule (i.e., to break ties) in the application domain rule base is fired where applicable. Thus, the user will be offered a rule consequent. For example, if the context were, $f_0, f_1, f_2, f_3$, then rule (1) would be fired as the most-specific match. Now, suppose that the context were given as, $f'_1, f_3$. Clearly, no rule in the application domain base will fire on this context. The context is matched against the application domain rule antecedents by hashing subsets of the context in order of non-increasing cardinality. When application rules of the same specificity are randomly selected vs. following move to head pointers, this favors the creation of more numerous (because of increased diversity in the skew) and thus ultimately smaller meta-rules, which tend to increase the size of the virtual rules space. This means that care should be taken so that contextual subsets of equal size are hashed in random order. If and only if no application domain rules can be fired by this method do we resort to virtual rule creation. It is more efficient to generate the virtual rules at runtime than store them because not only is this greatly conservative of space, but it allows for ordered/heuristic search, which is conservative of time. In all cases, the most-specific application rule covered by the context will be first to be fired. The best way to break cycles is to listen for an interrupt and then supply a new rule at that time, which maps the context to some desired action. Application domain rules may be non monotonic. This means that application rule consequents may add to, modify, and/or delete conjunctive functions in the context in an iterative fashion to enable or disable the firing of other rules. Hypotheses are generated as follows.

1. Visit rules in the application domain rule base as well as in the meta-rule base in order of their "move to head" pointers.
2. Apply each meta-rule on a candidate solution path to all matching application domain rules as guided by heuristic search. Expunge all relevant meta-rules that lead to a contradiction on the application rule base. Searching the meta-rules in order of the move to head list applies the current highest-probability of correctness meta-rules first.
3. Cycles (i.e., in the form of repeated contextual states) are detected and prevented using the cycle detection algorithm of the semantic normalizer. Cycles in the application of meta-rules will be implicitly addressed by the tree-search algorithm. Cyclic application rules are detected using hashing and are expunged. Power users may wish to program cyclic behavior, but this can always be accomplished using acyclic rules. The acyclic approach has the advantage of automatically detecting and eliminating unexpected cycles—even when cyclic behavior is otherwise desired. Think of this as structured programming vs. the inclusion of the goto.
4. If such application results in an antecedent, which is covered by the context, hash this antecedent to see if its' consequent differs from that stored in the application domain rule base, if present. If a contradiction is found, then if the sequence of meta-rules is of length one, then delete this meta rule and continue on. Similarly, rules in the meta rule base need maintain a logical pointer, which has a meta rule "move to the head" whenever it is part of a sequence of meta rules leading to a correct virtual rule. The same meta-rules are "moved to the bottom" whenever they are part of a sequence of meta-rules leading to a contradicted virtual rule. Here, the fired meta-rules are queued (FIFO) in both cases. Notice that while blame or reward cannot be ascribed to any individual meta-rule in a sequence of meta-rules, the aforementioned movement routines will allow for the maintenance of an ordering that approximates the blame or reward as a consequence of this statistical mechanical approach. This application-induced movement of meta-rules serves to make subsequent dreaming (i.e., skewed meta-rule induction) more relevant to current application needs.
5. In the absence of an interrupt, attempt to find solutions at virtual levels using hill-climbing in conjunction with backtracking. Virtual rules are ascribed a specificity metric, which is defined by maximizing |{contextual predicates}∩{antecedent predicates}|. The issues surrounding the use of this metric are a) transformation rules can be directly or indirectly right recursive for a fixed context and antecedent—implying runaway expansion of the RHS using the ADT; b) the consequent predicates should be randomized to maximize the reuse of any application rules—thus contributing to maximizing the size of the virtual rule space; c) the length of the consequent predicate sequence is a tractable surrogate metric (e.g., statistical mechanics) for randomness; d) the longer the consequent predicate sequence, the more difficult it is to maintain; e) the simplest corner-point rule is of the form $f_i \rightarrow p_j$, where the length of the LHS equals that of the RHS, which suggests that no RHS may exceed the ceiling of twice the average RHS lengths among the valid rules (if not twice, then the RHS might be stuck at a length of one—as well as the need for longer intermediate states in Type 0 transformations). Notice that $i+1=2*(1+2+3+\ldots+i)/i$. There is a heuristic symmetry here with the 3-2-1 skew, which suggests that the two methods could have been co-evolved. Furthermore, the use of an average serves to smooth the variance associated with using just the maximum RHS length in lieu, while allowing for gradual increase in the size of the RHSs. If the induced virtual rule is pruned as a result of the length of its RHS exceeding the allowed maximum, then the transforming sequence of meta rule(s) are moved to the bottom of the move to head list to avert recreation and to encourage replacement or deletion to disrupt cyclic meta-rule groups; and f) randomizing (i.e., minimizing) the sequence of applied meta rules would enforce a breadth-first search—contradicting the use of this most-specific-first heuristic. Whenever the application rule base acquires or loses a valid rule, it is necessary to efficiently re-compute the average lengths of the RHSs for all the valid rules and use this integer for pruning the heuristic search. (Note that the specificity metric given above is to be preferred to the one defined by minimizing |{antecedent predicates}|–{antecedent predicates}∩{contextual predicates}|, where the selected rule has a minimal metric because a) with scale, meta-rules tend to be valid allowing for deeper search; b) a most-specific rule is to be preferred in any case; c) the specificity metric converges on the minimal metric in view of statistical mechanics; and d) the specificity metric allows for noise, or non monotonic search, which serves to anneal the heuristic—allowing for the possibly more rapid discovery of more specific solutions.) Virtual rule nodes are expanded in the search in order of their non-increasing specificity metrics. In all cases, the most-specific contextual match is to be taken. The state space is maintained at length 2r, where r is defined to be the maximal length of the application rule base and r space will necessarily be filled with valid rules and an additional r space is allocated for virtual rules of which there are $O(r^2)$. Valid rules are matched such that when equally specific matches of the context are encountered, the last one matched going down the move to head list is selected. This is done because it increases the diversity of the meta-rule space, which leads to a larger virtual rule space. Conversely, virtual rules are matched such that when equally specific matches of the context are encountered, the first one matched going down the move to head lists is selected. This is done because being first on the move to head lists is associated with increased validity. Note that the use of data-dependent heuristic search at virtual levels not only insures a more uniform coverage of the search space than would be possible exclusively using breadth-first search at all levels (i.e., even when one allows for massively parallel processing); but, the loss in the guarantee of a minimum path length of meta rules is much more than offset by the increased likelihood of heuristically finding a solution path, where one exists. If a most-specific virtual rule is to be fired (and the user approves), then the virtual rule will have been checked for contradiction before presentation with the result that the transforming sequence of meta rule(s) are moved to the head of the move to head list using a queue (FIFO) structure to preserve the ordering. Similarly, if the most-specific virtual rule is found to be in contradiction with the application rule base (or if the user disallows), then these meta-rule(s) are moved to the bottom of the move to head list using a queue (FIFO) structure. We search to expunge meta-rules (i.e., if any single meta-rule maps an application rule to a contradictory application rule) just prior to their being moved to the head or bottom (where the transformational sequence is more likely to imbue erroneous meta-rules) of the move to head list. Moreover, if any single meta-rule maps a valid rule to a contradictory virtual rule, then it is immediately expunged, but the contradictory virtual rule may continue to undergo transformation as a form of annealing (without poisoning). It follows that we only check virtual rules for contradiction at the first level and prior to firing. Next, observe that thin meta-rules will tend to float to the top of the meta-rule base on account of their broad applicability. Also, meta-rules that do not fire tend to sink to the bottom of the meta-rule base. Finally, new meta-rules tend to replace the lowest, widest ones—insuring that invalid meta-rules will be automatically cleaned out over time (not to mention the delete off the bottom mechanism to remove the sludge). Furthermore, it follows from the Incompleteness Theorem that noise needs to be injected into the search heuristic to enable the discovery of novel solutions. By not checking more meta-rules for deletion than prescribed above we do the minimal number of checks necessary to insure that erroneous meta-rules will eventually be expunged or replaced. This then implies that noise will be maximal (because contradictory virtual rules may be transformed, but be rendered non-poisonous because invalid meta-rules are expunged as soon as found) at the later stages of search (because the further down the move to head list one goes, the less assured is the validity of the associated meta rule), as desired. It is proper to introduce limited noise into the system (e.g., erroneous virtual rules) so long as the generator of the noise is not amplified (e.g., by deleting erroneous meta-rules) in keeping with a statistical mechanical approach. Notice that incorrect meta-rules can play a role in the discovery of valid virtual rules. The process of checking meta-rules for deletion (and virtual rules for contradiction) operates in $O(r)$ time on $O(r)$ processors, which is no greater than the complexity elsewhere in the system. Note that this methodology requires recording the sequence of applied meta-rules leading to all states in the state space search. Such a record has the added benefit of facilitating the realization of a metaphorical explanation system.

Consider the following example of meta-rule application. Either meta rule (a) or (b) is applicable to rule (1) in the application domain rule base, but the first meta rule is selected by the inference engine as it is at the head of the "move to head" list. This application domain rule is mapped to the rule, $f_0, f_1, f_2, \rightarrow p'_0, p'_1, p'_2$. No further meta-transformations are applicable so this round stops. We observe that $f_0, f_1, f_2$ is not covered by the context. Thus, no hypothesis is yet to be had and we move on. Next, only the second meta-rule is applicable to the second application domain rule, which is thereby mapped to $f_1, f_3 \rightarrow p'_1, p_3$ and again the process naturally stops. Here, the context exactly covers the antecedent. This virtual rule is presented to the user as a creative hypothesis for further adjudication as follows.

If the user deems a virtual rule to be correct, then each member of the possible sequence of meta-rules needs to be checked individually for contradiction on the application rule base. Here, contradictions lead to the deletion of the offending meta-rule(s). Otherwise, move to the head of the move to head list each remaining meta-rule(s) in the sequence of meta-rules. Here, the fired meta-rules are queued. Insert the now validated rule at the head (i.e., using both pointers) of the application domain rule base.

If the user deems a virtual rule to be incorrect, then again each member of the possible sequence of meta-rules needs to be checked individually for contradiction on the application rule base. Here, contradictions lead to the deletion of the offending meta-rule(s). Otherwise, move to the bottom of the move to head list each remaining meta-rule, if any, in the sequence of meta-rules, which led to the invalidated hypothesis. Here, the fired meta-rules are queued. The user is given the option to generate another hypothesis using the aforementioned tree search, where possible.

If the user knows how to repair an incorrect virtual or valid rule, then insert the now validated and random rule at the head (i.e., both pointers) of the application domain rule base. Then, create a most-specific meta-rule, incorrect rule $\Rightarrow$ corrected rule. Here, cores and symmetric meta-rules are generated by a co-processor during a brief "nap". (The algorithm works better than any possible statistical skew solution here because it favors just the heads of the list during such brief interludes.) Delete from the newly-generated "core" and symmetric meta-rules those that induce application domain rules having the same antecedent, but different consequents in this rule base as well as those cored rules that do not correctly map at least one application rule to another (i.e., by default as a consequence of the generational method). Note that random knowledge can be inserted into the application domain rule base by creating appropriate situational contexts.

Antecedent functions and consequent procedures need to be expressed in as high a level language as possible to facilitate successful polymorphic (i.e., can be successfully mapped across many application domains—e.g., "fast" vs. "very fast" mean different things and thus have different realizations in distinct application domains) meta-rule transformation. Clearly, an (augmented) natural (i.e., randomized) language (i.e., one allowing for function and procedural attachments—e.g., balancing chemical equations) should be used to express their semantics. Note that this Type II KASER works best where the descriptive representation language is as random as possible, while the application domain is as symmetric as possible. The use of natural language better allows for the capture and expression of cross-domain transference via meta-rules. Thus, (augmented) natural language (i.e., random representation) is the best representation for the capture of domain knowledge and symmetries. Note that the randomization of languages can only be had with scale whereupon the existence of large randomized knowledge bases for interpretation is presumed. For example, you constantly update sets of functions and procedures for chess, while the system continuously evolves the best rules (and meta-rules) under the guidance of non-local feedback (see below). Similarly, a naval battle management system can be evolved using a natural language basis.

If the user cannot provide local feedback on the validity of a virtual rule and wishes to evolve the application rule base, then the use of an evolutionary model to provide global feedback is suggested. For example, two duplicate systems compete against each other in a game of chess. Undecidable virtual rules can be non-redundantly queued in a queue of length r. The problem with this approach is a) the user might be repeatedly asked to validate the same undecidable rules; b) causality with respect to positive or negative feedback might be attributable more to the decidable virtual rules than to the undecidable ones, which also implies, c) as the undecidable rule queue grows, it is slower to evolve. Thus, the following evolutionary program is put forth.

Whenever the user can be in the loop and contribute to improving the quality of the decision on the validity of a virtual rule above the chance level, he or she should. Where an evolutionary pair of systems exists, undecidable virtual rules are resolved by "flipping a coin"; otherwise, if in doubt the user must reply in the negative in this event to preserve the quality of the rule bases. The pair of systems must be provided with non-local feedback (in addition to local feedback where available). For example, non-local feedback may be said to occur whenever one wins or loses a game of chess. However, in keeping with the concept of domain generality as well as to minimize the number of erroneous valid rules, non-local feedback should be provided as soon as there is positive or negative feedback on a previous decision (e.g., when deciding whether a previous chess move was good or bad). Then, the valid and meta-rule bases are transferred from the "better" system to the "worse" system in constant time on an O(r) parallel processor machine. Both systems need a brief nap after each contextual match (e.g., using interrupts or chess clocks) to enable symmetric learning and when available, time to dream after receiving positive or negative feedback. Observe that if the meta-rule transformational process were disabled, then the system would evolve at a slow linear rate. However, when enabled, the chance validation of virtual rules implies an associated explosion in the number of new virtual rules (i.e., as a consequence of the induced meta rules), which in turn results in an explosion in the number of new chance validated rules, and so on for a supra-linear evolution in a symmetric domain not achievable using any other computational paradigm (e.g., neural networks climbing sigmoid functions).

(To be translated into algorithmic form): A natural language representation again enables cross-domain transference. This allows for the evolution of multi-domain heuristics (i.e., in the same machine), which can serve to accelerate the evolution of various application domain and meta-rules. This evolution is potentially explosive in symmetric domains and symmetric systems of domains—that is, to the degree that the evolved heuristics are better than chance. Of course, the heuristics must be less than perfect by definition, or they would solve the application domain problems a priori! For example, According to Nilsson [N. J. Nilsson, *Principles of Artificial Intelligence*, Mountain View, Calif.: Morgan Kaufmann Publishers, Inc., 1980], a good heuristic for the 8-puzzle is embodied by the last two terms in the equation, $f(n)=g(n)+P(n)+3S(n)$, where $g(n)$ is the lowest cost path from a given start node to some arbitrary node found so far by the search algorithm, $P(n)$ is the sum of the distances that each tile is from "home" (ignoring intervening pieces) and S(n) is a sequence score obtained by checking around the non central squares in turn, allotting 2 for every tile not followed by its proper successor and allotting 0 for every other tile; a piece in the center scores one. This heuristic function is not admissible, but allows for the rapid solution of much more difficult 8-puzzles. Similarly, a simple heuristic for chess is to move the King to the center of the board. Heuristic complexity can be readily increased by taking several heuristics as one. Without loss of generality, a pair of chess machines can be evolved by replacing uniform chance feedback as previously discussed with the "guided" feedback provided by a pair of heuristic machines. Each of the pair is linked to one member of the other pair. Then, the heuristic machines substitute for pure chance for making evolutionary decisions in the chess machines and obtain their feedback from the chess machines. Then, when one of the chess machines wins, not only are its valid and meta-rule bases transferred from the better chess machine to the lesser one, but the assumption may be made that this machine won because the better heuristic machine guided it. Thus, the valid and meta-rule bases are likewise transferred from the better heuristic machine to the lesser one. The heuristic machines generate Boolean questions to enable their evolution just as is the case with the chess machines. Note that these questions are more random (i.e., higher level) than are the questions posed by the chess machines. These questions are passed on to a network of companion system pairs for adjudication. If a response is not received by the time of an interrupt, then a "coin will be flipped" to anneal the system. However, "God prefers not to play dice". The guarantee of such decision resolutions allows for closed feedback among companion system pairs. The resultant cycles serve to non-linearly amplify all decisions to the extent that they are better than chance, which of course is a function of the degree of symmetry among machine knowledge bases. Notice that the heuristic machines can operate in a transitive manner. This is in keeping with the concept of minimizing knowledge chunks to facilitate reuse. More specifically, one pair of heuristic machines can serve to transfer knowledge evolved from playing checkers to playing chess (and vice versa). Notice that no matter how orthogonal mutually random domains are, they cannot statistically do worse than chance in their adjudication—i.e., chance remains the lower bound. In summary, the closed-loop interaction of Type II KASERs using a natural language representation can potentially fulfill the dream of self-organizing (aware?) machines.

Explanations may be given as rule traces as is the case with conventional expert systems. Moreover, virtual rules can be readily explained by showing the similarity (symmetry) to the application domain rule from which they were mapped. Furthermore, the power user can opt to see a dump of the applicable sequence of meta-rules used in the mapping.

Meta rules, which are constrained to effect at least one correct map will occur far less often than otherwise. A relative paucity of meta-rules serves to limit the bushiness of the virtual rule formation tree, which in turn serves the goal of tractability. Meta rules are most efficiently maintained if they are only checked for contradiction when applied on an executed solution path. It is desirable to recheck meta-rules because the application domain rule base rapidly evolves given access by parallel users. Furthermore, application rules can overwrite others in the base so that it is not appropriate to expunge meta-rules until the last moment when they are used for the formation of virtual rules (i.e., in keeping with the stipulations of truth maintenance and statistical mechanics). It is permissible, if as a result of application rule deletion, that meta-rules may exist, which don't currently map one application rule to another. This is to be allowed out of efficiency considerations given that erroneous meta-rules will be expunged before they can generate more than one executed virtual rule per processor.

Distinct parallel processors can simultaneously drive the processes of Symmetric Meta-rule Induction (SMI) and Random Meta-rule Induction (RMI) in dream mode. SMI is defined by taking a distinct pair of meta-rules, which are randomly selected (i.e., using the 3-2-1 skew on the "move to head" pointer). A single test is made to see if one will map the other onto a symmetric meta-rule. Again this candidate meta rule is hashed to be sure that it does not already exist in the meta-rule base (if it already exists, it is moved to the head using both pointers). Then, the meta-rule maps each rule of the application domain rule base to be sure that does not lead to the aforementioned contradiction. If a contradiction is found, each of the pair of generating meta rules is applied to the application rule base, which results in deletion of the offending meta rule if a contradictory application rule is generated and if not, then the meta-rule is moved to the bottom of the "move to head" list and the candidate meta-rule is discarded. Otherwise, the parent meta-rules are again checked for contradictory application rule generation and if this does not result in deletion, they are moved to the top of the "move to head" list, since this operation in and of itself does-not add to the number of meta-rules on the list. Note that whenever meta-rules are moved to the head of the meta-rule base, we need to assure that invalid meta-rules fall to the bottom, which implies that meta-rules moved to the head need to be checked for validity. Similarly, meta-rules that are moved to the bottom need to be so checked because this represents an opportune time to expunge a likely to be found bad meta-rule (and is symmetric with other movements in the system). The induced meta-rule is inserted at the bottom of the "move to head" and transposition lists subject to non-increasing length requirements, since the acquisition is yet to be subjected to transposition and a bottom placement does not induce a reordering on the "move to head" list. Note that any successful/unsuccessful attempt to fire an application rule induces an upward/downward transposition in the application-rule transposition list. Similarly, any move to head (bottom) operation in the meta-rule move to head list induces an upward (downward) transposition in the meta-rule transposition list. Symmetric rules, like the randomly generated ones, are selected for coring using the 3-2-1 skew on the "move to head" pointer.

Note: Given, $M(A) \rightarrow B$, $M(B) \rightarrow C$, and $M(A) \rightarrow C$, then one need only retain the first two meta rules as a randomization of the three of them. This will be statistically accomplished by the fact that the first two, being more general, will fire and be tested more often. Thus, the third meta-rule is more likely to fall off the back of the base as a result of transposition. Meta-rules map domain-specific rules to create a society of mind. This again allows for parallel processing. Meta rules provide evidence for the assertion that the genes created the mind in their own (i.e., transformational) image.

ALGORITHM

1. The output of the semantic normalizer serves as the input to this algorithm. Application rule consequents should be run through the semantic normalizer prior to saving. Note that the semantic normalizer is more or less trained for associative correction and recall using the "Burdell Algorithm" (contained in the Message Summarizer disclosure to be submitted). Furthermore, procedurally modifying the context via "posting" and "retraction" (i.e., truth maintenance) operations may be automated in the case of augmented natural languages. Otherwise, it is better to mediate truth maintenance through interaction with the user. Note that the semantic normalizer may receive this training (i.e., especially in a closed domain) during this time for eventual deployment.

2. /* While this algorithm is predicated on the use of natural (randomized) language, we allow for the use of functional antecedents and procedural consequents (e.g., for playing chess). Note that the set of applicable functions and proper procedures may be evolved using non-local feedback. */

3. /* Natural language will be manually broken into conjunctive antecedent phrases and sequential procedural consequent phrases. These phrases result from mapping a Type 0 language into a finite number of context-free tokens. This process will converge for any closed domain. Note that the normalized phrases output by the semantic normalizer should only be corrected when they specify an incorrect semantics. */

4. /* All domains are saved in a common application rule base served by multiple processors. */

5. Application domain rules are of the form, $f_0, f_1, f_2, \ldots \to p_0, p_1, p_2, \ldots$ Examples of automatically created meta rules follow.
   a. $f_0, f_1, f_2, \ldots \to p_0, p_1, p_2, \ldots \Rightarrow f'_0, f'_1, f'_2 \ldots \to p'_0, p'_1, p'_2 \ldots$ (most specific meta rule)
   b. $f_1 \to p_1 \Rightarrow f'_1 \to p'_1$ (a more general meta rule)
   c. $f_0, f'_1, f_2, \ldots \to p_0, p'_1, p_2, \ldots \Rightarrow f'_0, f'_1, f'_2, \ldots \to p'_0, p'_1, p'_2, \ldots$ (apply (b) to (a) for symmetric meta rule induction)

6. All meta rules must a) map at least one application rule to another (e.g., a most-specific meta rule by definition) and b) may not map any application rule to another such that the mapped rule (i.e., the image) has the same antecedent as, but a different consequent from another in the application rule base (i.e., a contradiction). Contradiction may be most efficiently discovered through the use of hashing.

7. A pair of distinct application domain rules are selected at random using the Mersenne Twister algorithm. This pair forms a most-specific candidate meta-rule using the notation, $L1 \to R1 \Rightarrow L2 \to R2$.

8. The most-specific candidate meta-rules already satisfy the one to one mapping and thus only need be checked for contradiction. If contradictory, the candidate meta-rule is discarded. Candidate most-specific meta-rules are generated until an interrupt occurs, or a non-contradicting one is found. The meta-rule base is filled, in parallel, with most-specific, cored, and symmetric meta-rules. Whenever the meta-rule base's limiting size is reached, expunge the lowest meta-rule on the base as ordered by the transposition list (i.e., including any dangling fs and ps).

9. Form cores of the form, $L1' \to R1' \Rightarrow L2' \to R2'$.

10. First, compute the meta-rule antecedents:
    a. $L1' \leftarrow L1 - L2$
    b. $L2' \leftarrow L2 - L1$
    c. Common $\leftarrow L1 \cap L2$
    d. For each member of the power-set of common (PSC) (i.e., the set of all subsets of which there are $2^{|common|}$) do/*Maintain lexicographic order to facilitate search. */
        $L1' \leftarrow L1' \| PSC$
        $L2' \leftarrow L2' \| PSC$
    e. For example if $L1=\{f_0, f_1, f_2\}$, $L2=\{f_1, f_2 f_3\}$, then $L1' \leftarrow \{f_0\}$, $L2' \leftarrow \{f_3\}$. Common $\leftarrow \{f_1, f_2\}$. Then, $L1' \leftarrow \{f_0\}, \{f_0, f_1\}, \{f_0, f_2\}, \{f_0, f_1, f_2\}; L2' \leftarrow \{f_3\}, \{f_1, f_3\}, \{f_2, f_3\}, \{f_1, f_2, f_3\}$. Thus, candidate cores will be of the form,
        $\{f_0\} \to R1' \Rightarrow \{f_3\} \to R2'$;
        $\{f_0, f_1\} \to R1' \Rightarrow \{f_1, f_3\} \to R2'$;
        $\{f_0, f_2\} \to R1' \Rightarrow \{f_2, f_3\} \to R2'$; and
        $\{f_0, f_1, f_2\} \to R1' \Rightarrow \{f_1, f_2, f_3\} \to R2'$.
    Note that we only generate one cored rule LHS candidate per most-specific parent meta-rule. Also, a member of the power set is generated by "flipping a coin" (i.e., using the Mersenne Twister) to determine the membership of each $f_i$ found in the set common. Note that these candidate meta rules LHSs (as well as their cores) satisfy the one to one application rule mapping requirement, saving on search time.

11. Next, compute the meta consequents:
    a. $R1' \leftarrow R1$
    b. $R2' \leftarrow R2$
    c. Min $\leftarrow \min \{|R1'|, |R2'|\}$
       For i=0 to Min do/* left justified */
       If $R1'[i] == R2'[i]$, "flip a coin" to determine whether or not to delete $Rk'[i]$ (i.e., without closing the created space at this time, delete from $R1'$ and $R2'$).
       Else break/* exit for loop */
       If $Rk'[i]$ deleted
           Min $\leftarrow$ Min$-1$/* Don't need go this far to left later. */
           continue
       Otherwise, break
       If Min$==0$
           $R1' \leftarrow R1$
           $R2' \leftarrow R2$
           /* Restore the full procedural sequences if one side or the other is reduced to NIL. */
       Else
           For i=0 to Min do/* $R1'[last]$ and $R2'[last]$ refer to the last member of the respective sequences and need not refer to the same array position. */
           If $R1'[last-i] == R2'[last-i]$, "flip a coin" to determine whether or not to delete $Rk'[last-i]$ (i.e., without closing the created space at this time).
           Else break/* exit for loop */
           If $Rk'[last-i]$ deleted
               Min $\leftarrow$ Min$-1$/* If all $p_i$ are deleted, need to restore full sequence. */
               continue
           Otherwise, break
           If Min$==0$
               $R1' \leftarrow R1$
               $R2' \leftarrow R2$
               /* Restore the full procedural sequences if one side or the other is reduced to NIL. */
           If Min$<>0$
               Left-shift $R1'$ and $R2'$ to coalesce possible holes.
               /* Note that we only generate one cored rule RHS candidate per most-specific parent meta-rule. Also, these candidate meta-rules RHSs (as well as their cores) satisfy the one to one application rule mapping requirement, saving on search time. */

12. At this point, a single candidate meta-rule is synthesized from the Lk' and Rk' cores found above. This approach is best suited to massive parallel processing. Again, these candidate meta-rules already satisfy the one to one mapping requirement and thus only need be checked for contradiction.
13. The meta-rule is hashed to make sure that an exact duplicate is not already resident in the meta-rule base. Note that meta-rules may be non deterministic—unlike application rules. A transposition list and a "move to head" list are maintained for the application rule and meta-rule bases. Duplicate meta-rules are moved to the head of the move to head list and transposed up on the transposition list.
14. In the application rule base, rules are transposed on the transposition list whenever they are successfully/unsuccessfully fired. In the meta-rule base, rules are transposed on the transposition list whenever they are retained and moved to the head/bottom. Existing application rules move to the head of the move to head list whenever they are fired. New application rules are inserted at the top of both lists. The application and meta-rule bases are maintained in LFU ordering using the transposition list where the LFU rule is first to be expunged.
15. Meta-rules are hashed to assure non-redundancy as before. Distinct new meta-rules are moved to the bottom of the move to the head pointer and transposition lists after being checked for contradiction. Meta-rules are inserted until the meta-rule base is full and thereafter a new meta-rule replaces the first meta-rule having the same or greater length, if any, traversing the transposition list from bottom to top. Here, length is defined by $|f+p| \geq 1$, where a meta-rule can transform just the $f_i$s or the $p_j$s. Notice that the shortest meta-rules are preserved. The meta-rule base is of length r, where r is the maximum allowed number of rules in the application rule base. r should be set as large as possible such that every metaphorical search can tractably apply the best of $O(r^2)$ meta rules. The maximum meta-rule length in the base is maintained in a variable to prevent unnecessary linear search. Note that linear search time here is consistent with constant search time using $O(r)$ processors.
16. Whenever the processor(s) would otherwise be idle, enter dream (nap) mode, which is exited by interrupt (e.g., speaking or keyboard entry). Upon entering dream mode, first expunge the very last and only the very last rule (i.e., whatever the length of the meta-rule base happens to be) on the meta-rule base transposition list. This meta-rule is the LFU (e.g., sludge).
17. Whenever a most-specific rule is found to be non-contradictory and can be added to the meta-rule base, a random core is attempted. If this too survives (i.e., can be added to the meta-rule base), then it too will have one attempt made to core it, and so until the randomly generated core is not acquired for any reason. At this point, the first processor resumes creating candidate most-specific meta-rules. Apply the 3-2-1 skew algorithm, using the move to head lists of the appropriate bases, to the following tasks run on concurrent processors.
    a. When selecting application domain rules to form candidate most-specific meta-rules.
    b. When selecting rules in the meta-rule base to core.
    c. When selecting pairs of rules in the meta-rule base to form candidate symmetric meta-rules. Symmetric candidate meta-rules need to be checked for contradiction prior to acquisition. The candidate meta-rule is hashed to be sure that it does not already exist in the meta-rule base. Again, if it already exists, it is moved to the head using both pointers. Then, the meta-rule maps each rule of the application domain rule base to be sure that does not lead to a contradiction. If a contradiction is found, each member of the pair of generating meta rules is applied to the application rule base, which results in deletion of the offending meta rule if a contradictory application rule is generated and if not, then the meta-rule is moved to the bottom of the "move to head" list using a queue (FIFO) and the candidate (image) meta-rule is discarded. Otherwise, the parent meta-rules are again checked for contradictory application rule generation and if this does not result in deletion, they are moved to the top of the "move to head" list using a queue (FIFO), since this operation in and of itself does-not add to the number of meta-rules on the list. Note that applying a cored meta-rule to its parent will always produce the parent. Most-specific meta-rules may be created using the following algorithm.

i=2
    Repeat
        For j=1 to i
            Repeat
                Select a pair of rules using a uniform random number generator (Twister) with numbers in [1, i]
            Until
                Wake-Up or the LHS and RHS of the pair are distinct
                /* The created pair constitutes a most-specific meta-rule. */
        If i<current number of rules in the base, i←i+1
    Until
        Wake-Up 18. Using multiple processors, dreaming occurs between contextual presentations (i.e., whenever a new rule is added to or transposition occurs on the application domain rule base) when the move to head list is updated and the skew restarted from the top. When not dreaming, released processors will work together to parallelize the meta-rule tree search.
19. Valid, virtual (i.e., hypothetical), and meta-rules are (created and) fired as follows.
    a. New meta-rules that are most specific, resulting from coring, or as a result of symmetric induction are inserted at the bottom of the move to head list and bottom-up on the transposition list.
    b. Valid and virtual rules are maintained in an abstract data type (ADT) defined as follows. Here, all rules are tagged with their derivation path and an integer specificity metric, defined by maximizing |{contextual predicates}∩{antecedent predicates}|. The context and rule antecedents, being sets, are captured without redundancy in lexicographic order to facilitate pattern matching. The ADT is ordered from top to bottom in non-increasing order of this metric. This is accomplished using binary insertion in $O(\log_2 r)$ time. The filled ADT is maintained at length 2r, where r is defined to be the maximal length of the application rule base as before and $O(r)$ space will necessarily be filled with valid rules and an additional $O(r)$ space is allocated for virtual rules of which there are $O(r^2)$. The allowance for deletion off the bottom to free space in the ADT means that some solutions may not be found, but it also preserves the most-specific rules having minimal length consequents at the top—improving the likelihood of finding and firing a most-specific rule having a minimal length consequent.

c. Visit rules in the application domain rule base as well as in the meta-rule base in order of their move to head pointers. First, the ADT is filled using unmarked valid rules along with their specificity metric—including the zero metric. If ever this metric=|context|=|antecedent|, then insert the rule at the very top of the ADT, fire this perfectly matched valid rule with user approval (see below), and iterate. If this rule is deemed by the user to be correct, then move it to the head of the application rule base for both pointers. Otherwise, whenever this metric=|antecedent|, insert the rule, which may be fired, at the top of its specificity-tier among equally long specificity metrics (i.e., the last valid rule among equal specificity metrics is to be preferred because this reverses the previous order of the move to head list—implying more diversity in the induced meta rules (which tend to be shorter as a consequence) when it is moved to the head of the move to head list (only as a result of firing), increasing the size of the virtual rule space—i.e., annealing), and save this rule along with its specificity metric and null derivation path in the ADT. Upon the receipt of an interrupt, a perfectly matched or other valid rule, fire the unmarked match, if any, having the maximal specificity metric in top-down order on the ADT. Again, a rule on the ADT can be fired if and only if it specificity metric=|antecedent|. If the presented rule is deemed by the user to be correct, then move it to the head of the application rule base for the move to head list and transpose it up on the other list. Otherwise, the next unmarked matching rule, which can be fired, if any, may be taken by moving down on the linked ADT list. Notice that users may nondestructively (i.e., without changing the context or pointer lists) fire more than one rule where possible. If the system cannot find a valid rule to fire, reply to the user to the effect, "No valid application rule can be found, which is fired by the context at this time". The user may then elect to return to search the valid rule space (i.e., in a concurrent implementation) or virtual rule space (i.e., where possible and non-redundant as indicated by remaining unmarked virtual rules), or alternatively elect to define a new valid rule. If a valid rule is created to correct an existing one (i.e., truth maintenance), then create a most-specific meta-rule, incorrect rule ⇒corrected rule and make one attempt to core it.

d. The highest member of the ADT linked list, which is unmarked, gives the first (next) rule to be transformed in the best-first heuristic search. This rule is visited by applying all applicable meta-rules in order of their move to head pointers after which this rule is marked (i.e., using a parallel architecture or before processing any newly created virtual rules using a serial processor). Marked rules are never expunged to avert their duplication in the ADT; although, some may fall off the bottom. The resultant virtual rules are managed just as were the valid rules except that a) If the length of the RHS of the virtual rule exceeds the ceiling of twice the average RHS lengths among the valid rules (as efficiently dynamically maintained upon the acquisition or deletion of valid rules), then the virtual (intermediate) rule is either unacceptably complex (i.e., long in its RHS) or symmetric (i.e., cyclic in its RHS). Such unacceptable virtual rules are treated the same as contradictions, where the transforming sequence of meta rule(s) are moved to the bottom of the move to head list using a queue (FIFO) structure (to avert recreation and to encourage replacement or deletion to disrupt cyclic meta-rule group formation); b) If a most-specific virtual rule is to be fired (and the user approves), then the virtual rule will have been checked for contradiction prior to user presentation with the result that the transforming sequence of meta rule(s) are moved to the head of the move to head list using a queue (FIFO) structure to preserve the ordering. Similarly, if the most-specific virtual rule is found to be in contradiction with the application rule base (or if the user disallows), then these meta-rule(s) are moved to the bottom of the move to head list using a queue (FIFO) structure; c) We search to expunge meta-rules (i.e., if any single meta-rule maps an application rule to a contradiction of its consequent) just prior to their being moved to the head or bottom (where the transformational sequence is more likely to imbue erroneous meta-rules) of the move to head list. Moreover, if any single meta-rule maps a valid rule to a contradictory virtual rule, then it is immediately expunged, but the contradictory virtual rule may continue to undergo transformation as a form of annealing (without poisoning—since the error-inducing meta-rule is purged). It follows that we only check virtual rules for contradiction at the first level and prior to firing; d) Whenever a bona fide candidate has a specificity metric=|antecedent|, then hash (i.e., to avoid the cost of rule-matching using binary insertion) the virtual rule (which can be fired), to make sure that it is not already in the ADT (i.e., cycle detection), insert it at the bottom among the tier of equally long specificity metrics (i.e., the first hypothesis among equal specificity metrics is to be preferred because it is first on the move to head lists—implying a greater likelihood of being valid), and save the virtual rule along with its metric and derivation path in the ADT; and, e) The fired virtual rules, if any, are stated to be hypothetical (and presented along with an optional metaphorical explanation). The sequence of meta-rules that were applied in the derivation, if any (i.e., none are applied for valid rules), are stored in a linked list (to the left) of the resultant rule in the ADT. If the system cannot find a virtual rule to fire, reply to the user to the effect, "No virtual application rule can be found, which is fired by the context at this time". The user may then elect to return to search the valid (i.e., if and only if the application rule base has been updated in a concurrent environment) or virtual rule space (i.e., where possible and non-redundant), or alternatively elect to define a new valid rule, or return to nap (dream) mode (until awaken by an interrupt), whereupon the system may have acquired more virtual knowledge applicable towards a solution.

e. The search terminates if ever all the rules on the ADT are marked and no rules on the ADT have been subject to deletion. However, if rules fall off the bottom of the ADT, then such termination cannot be guaranteed (nor can a complete search be assured) and the search must be interrupt (or success) driven as a result.

f. The system provides an explanation trace option whereby a tagged (i.e., with respect to rule type)

sequence of fired valid rules, meta-rules, and virtual rules is dumped in a user-specified window size (FIFO queue).

g. (Evolutionary Program) If the user cannot provide local feedback on the validity of a virtual rule and wishes to evolve the application rule base, then use the following evolutionary model to incorporate global feedback. Whenever the user can be in the loop and contribute to improving the quality of the decision on the validity of a virtual rule above the chance level, he or she should. Where an evolutionary pair of systems exists, undecidable virtual rules are resolved by "flipping a coin"; otherwise in this case if in doubt, the user must reply in the negative to preserve the quality of the rule bases. The pair of systems must be provided with non-local feedback (in addition to local feedback where available). For example, non-local feedback may be provided whenever one wins or loses a game of chess. However, in keeping with the concept of domain generality as well as to minimize the number of erroneous valid rules, non-local feedback should be provided as soon as there is positive or negative feedback on a previous decision (e.g., when deciding whether a previous chess move was good or bad). Then, the valid and meta-rule bases are transferred from the "better" system to the "worse" system in constant time on an O(r) parallel processor machine. Both systems need a brief nap after each contextual match (e.g., using interrupts or chess clocks) to enable symmetric learning and when available, time to dream after receiving positive or negative feedback.

20. Cycles need to be detected and broken in the application rule base whenever the context changes state. The following cycle-detection algorithm removes cycles as heuristically detected through the exercise of the application rule base. Simple cycles, such as generated by the pair of rules, u→v, v→u are detected when the contextual state, u, first repeats. More complex cycles, such as generated by the three rules, u→v, v→wu, w→v are detected when the transformed context, wu has the subsequence u hash onto the same previously saved entry. Notice that the removal of cycles will tend to expunge unnecessarily long transformational chains and replace them with shorter paths when next acquired. Note that a version of the following cycle-detection algorithm has been previously written for the semantic normalizer.

a. The Cycle-Detection Algorithm: /* Purge application rules that lead to cyclic behavior. */ b. If the Cycle-Detection hash table is empty, save the context in the hash table and Return c. Else generate distinct subsequences of the transformed context in an arbitrary order (i.e., on a parallel machine) that tests each subsequence no more than once—e.g., subsequences of length 1, 2, ..., n−1, n (i.e., on a serial machine to eliminate the cyclic rules fastest). There are n(n−1)/2 such subsequences. Reset the subsequence generator so that it will generate the shortest subsequence in the next step. Note that the use of an arbitrary order is possible because the application rule base is maintained to be relatively acyclic with exercise.

d. L1: Generate the first (next) contextual subsequence. Thus, if the context were uvw, the subsequences would be generated in the order u, v, w, uv, vw, and finally uvw.

e. The contextual subsequence is hashed to see if it exactly matches some context in the hash table. For example, the contextual subsequence, uv only matches the hash entry uv—not uvw, nor v.

f. If a match was not found and there are more subsequences to generate, go to L1.

g. If a match was found then h. Delete the last rule fired by the application rule base./* i.e., the rule that induced the cycle */
Restore the previous context.
/* Maintain the same hash table and transfer control to the application rule base. */ i. Return./* Cyclic behavior is not detected. */

21. End.

What is claimed is:

1. A method for evolving a rule base of an expert system on a computer, the method comprising:

populating an application rule base stored in the computer with deterministic and semantically normalized application rules, wherein each application rule is of the form $f_0, f_1, f_2, \ldots \rightarrow p_0, p_1, p_2, \ldots$;

while the computer is in a dream mode, automatically populating a meta-rule base with nondeterministic meta-rules of the form $f_0, f_1, f_2, \ldots \rightarrow p_0, p_1, p_2, \ldots \Rightarrow f'_0, f'_1, f'_2, \ldots \rightarrow p'_0, p'_1, p'_2, \ldots$, wherein each meta-rule maps to two distinct application rules;

in response to a query regarding a given context, searching the application rule base for an application rule that has a matching context;

if no application rule is found with a matching context, deriving from a sequence of meta-rules a virtual rule with a matching context and a corresponding antecedent; and adding the virtual rule to the head of the application rule base if the virtual rule does not contradict an existing application rule and the virtual rule is validated by a user, and moving each meta-rule involved in the creation of the validated virtual rule to the logical head of the meta-rule base.

2. The method of claim 1, further comprising the following step if the virtual rule contradicts an existing application rule or is rejected by the user:

expunging the virtual rule, and moving each meta-rule involved in the creation of the rejected virtual rule to the logical tail of the meta-rule base unless only one meta-rule was involved in the creation of the rejected virtual rule, in which case the single, involved meta-rule is expunged.

3. The method of claim 2, further comprising populating the meta-rule base by:

coring most specific meta-rules to create more-general meta-rules of the form $f_1 \rightarrow p_1 \Rightarrow f'_1 \rightarrow p'_1$; and creating symmetric meta-rules by symmetric induction, wherein each symmetric meta-rule is of the form $f_0, f_1, f_2, \ldots \rightarrow p_0, p'_1, p_2, \ldots \Rightarrow f'_0, f'_1, f'_2, \ldots \rightarrow p'_0, p'_1, p'_2, \ldots$.

4. The method of claim 3, further comprising the step of expunging the meta-rule at the logical tail of the meta-rule base each time the computer enters dream mode after the meta-rule base is fully populated.

5. The method of claim 4, wherein the first meta-rules to be expunged are the meta-rules having the greatest length.

* * * * *